United States Patent Office 3,097,816
Patented July 16, 1963

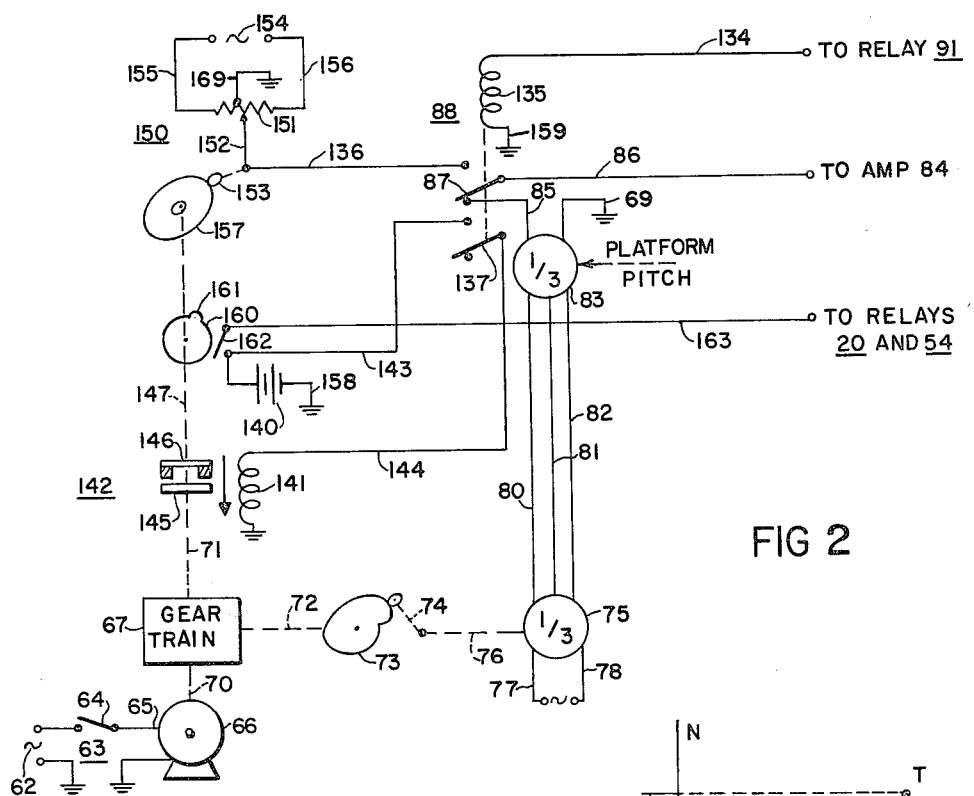
FIG 2
FIG 4
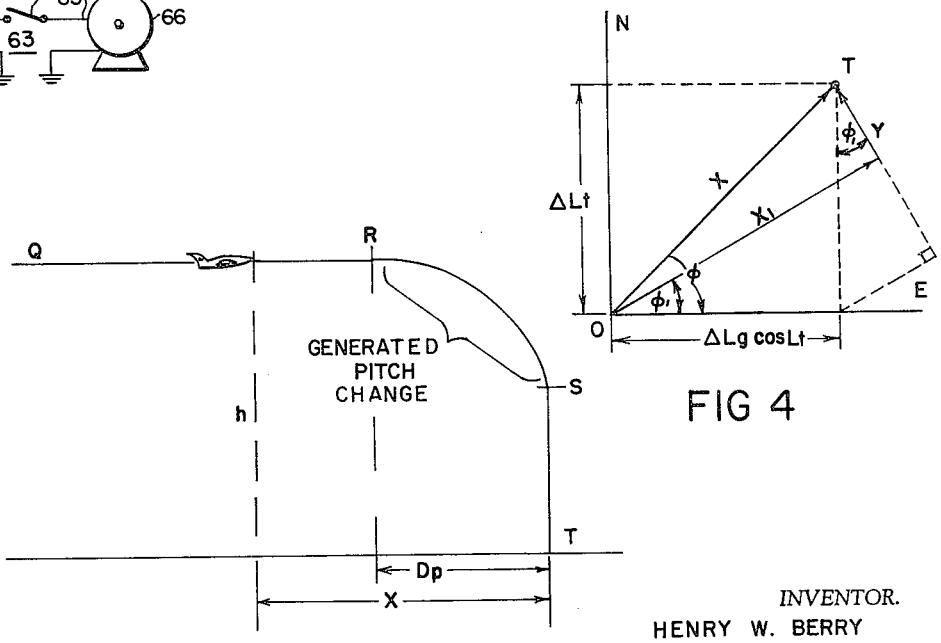
FIG 3
INVENTOR.
HENRY W. BERRY
BY Roger W. Jensen
ATTORNEY

3,097,816
ATTITUDE CONTROLS
Henry W. Berry, Largo, Fla., assignor to Minneapolis-Honeywell Regulator Company, Minneapolis, Minn., a corporation of Delaware
Filed Sept. 22, 1958, Ser. No. 762,488
5 Claims. (Cl. 244—14)

This invention relates to the field of attitude control for an airborne craft and more particularly to a control for causing the craft to dive onto a fixed target.

A general method of controlling the movement of a dirigible craft to cause it to strike a fixed target is to maintain the velocity vector of the craft in alignment with the direction of the target from the craft. This method has the advantage, subject to minor correction in the presence of cross motion of the medium in which the craft is moving, of resulting in the shortest path of the craft, and also the further advantage of calling for no information as to the distance between the craft and the target, or as to the closing speed.

It does, however, require accurate information as to the location of the target and as to the instantaneous position of the craft: in the case of aircraft this information must of course be three-dimensional.

The location of an aircraft target is of course, determinable with great accuracy from cartographic data. For ground-to-ground missiles, the location of the take-off point can equally accurately be determined, and computing devices are known for deriving the rectangular components of the horizontal movement of the craft, so that its instantaneous position with respect to the target can continue to be noted. For air-to-ground missiles the launch point is determinable as just described, and the same type of computer on the missile can continue to keep the data up to date. Thus, information as to the instantaneous location of the craft relative to the target on two orthogonal axes is readily available, and is conveniently expressed in terms of latitude difference $\Delta L_t$ and longitude difference $\Delta L_g$. While these actually take the form of angular quantities, it is simple to convert them to distances since the radius of the earth is known.

The instantaneous position of the craft relative to the target along the third, or vertical, axis is not so accurately available. Many forms of altimeter are known, but none give the vertical component of the displacement of the aircraft from the target with an accuracy comparable to that for $\Delta L_t$ and $\Delta L_g$. This inaccuracy seriously affects the accuracy of control of a craft according to the general method. I have invented a new method of aircraft control, which improves accuracy of operation, by use of a path which is different from the general path.

According to my method, the craft moves at a substantially constant altitude $h$ until, in effect, the quantities $\Delta L_t$ and $\Delta L_g$ are both zero, and then moves along the remaining axis, that is, in a vertical direction, until the target is reached. Actually, I cause the craft to begin a pitch-over maneuver, or change from horizontal to vertical movement, at a point defined by such values of $\Delta L_t$ and $\Delta L_g$ that when the craft has had time to complete the maneuver the differences are both zero. The initial altitude is chosen such that the pitch-over maneuver is completed before the craft reaches the target, but otherwise it does not matter, except for minor wind effects, what may have been the initial vertical component of displacement of the craft from the target.

Since the structural limitations and dynamic characteristics of the craft are known, it is possible to determine for any air speed the "time-to-go," $T_g$, or interval required to execute a safe 90 degree pitch-over maneuver, and hence the horizontal distance from the target at which such a maneuver should be initiated. I prefer to schedule the pitch-over maneuver according to the equation $$\theta = K_1(X - K_2\dot{X}) \qquad (1)$$

where $\theta$ is the pitch angle of the aircraft and is zero when the aircraft is pointing straight down, X is the horizontal distance of the craft from the target, and $K_1$ and $K_2$ are suitable constants. For one craft $K_1$ was found to have a value of unity and $K_2$ was numerically equal to the time-to-go in seconds. Until the beginning of the pitch-over maneuver, $K_2\dot{X}$ is very much greater than X. In pitch control according to this equation, displacement and rate signals are combined to provide rate damping for the aircraft in its lateral dive.

I prefer to initiate the programmed control of pitch angle at a value of X which I call the distance to pitch-over, $D_p$. This distance is related to the ground speed $V_h$ of the aircraft by the equation $$D_p = \int_0^t V_h dt \qquad (2)$$

Since $V_h$ is essentially constant, $D_p$ may be determined from this quantity and the time-to-go, $T_g$, without significant error, by the use of the equation $$D_p = V_h T_g \qquad (3)$$

The quantity $V_h$ may be determined from information which is normally available in the computer which supplies $\Delta L_t$ and $\Delta L_g$, and the quantity $T_g$ may be manually set on the basis of aircraft characteristics. Thus, the pitch-over maneuver is to be begun when the distance X assumes the value $V_h T_g$, that is, when it becomes equal to the predetermined value of $D_p$.

One method of controlling the pitch attitude of the craft is to supply to the pitch channel of the autopilot a signal which is representative of Equation 1, so that the craft will have reached the target when the position error or distance signal and the velocity error signal are zero simultaneously. During the period of operation in which the craft is diving towards the target, the vehicle may also be either to the left or right of the target, and if this is the situation, the normal lateral control of the aircraft continues to function.

Another method of controlling the craft is to create a pitch-over attitude as a function of velocity, structural limitation, and approximate altitude. That is, the pitch-over point is determined first and at that point an open loop pitch command is given. After a sufficient time has elapsed for the craft to achieve a vertical dive, the pitch attitude control is changed to automatic control utilizing signals representative of Equation 1.

It is therefore a general object of this invention to provide attitude control for a dirigible craft which will change the pitch attitude of the craft through an angle of 90°.

It is another object of the present invention to steer the craft to a known destination by azimuth corrections only, change the pitch attitude to a vertical attitude and again steer the craft by azimuth corrections only.

It is still another object of the present invention to protrol the attitude of the dirigible craft in terms of track and cross track signals when in a level attitude and when in a vertical diving attitude.

It is still another object of the present invention to provide means for determining where a craft should commence a dive to steer the aircraft to a target location of which only two coordinates are known.

It is a further object of the present invention to control a craft to a level attitude, then change the pitch attitude, and finally use the same information which controlled the craft while in the level attitude for controlling the craft while in the changed attitude.

These and other features of the invention will be understood more clearly and fully from the following detailed description and accompanying drawing in which:

FIGURE 2 is an embodiment of the pitch programer shown in FIGURE 1;

FIGURE 3 is a diagram showing the vertical path followed by the craft in arriving at its destination; and FIGURE 4 is a diagram showing the relationship of variables in the azimuth control portion of my invention.

Figure 1:
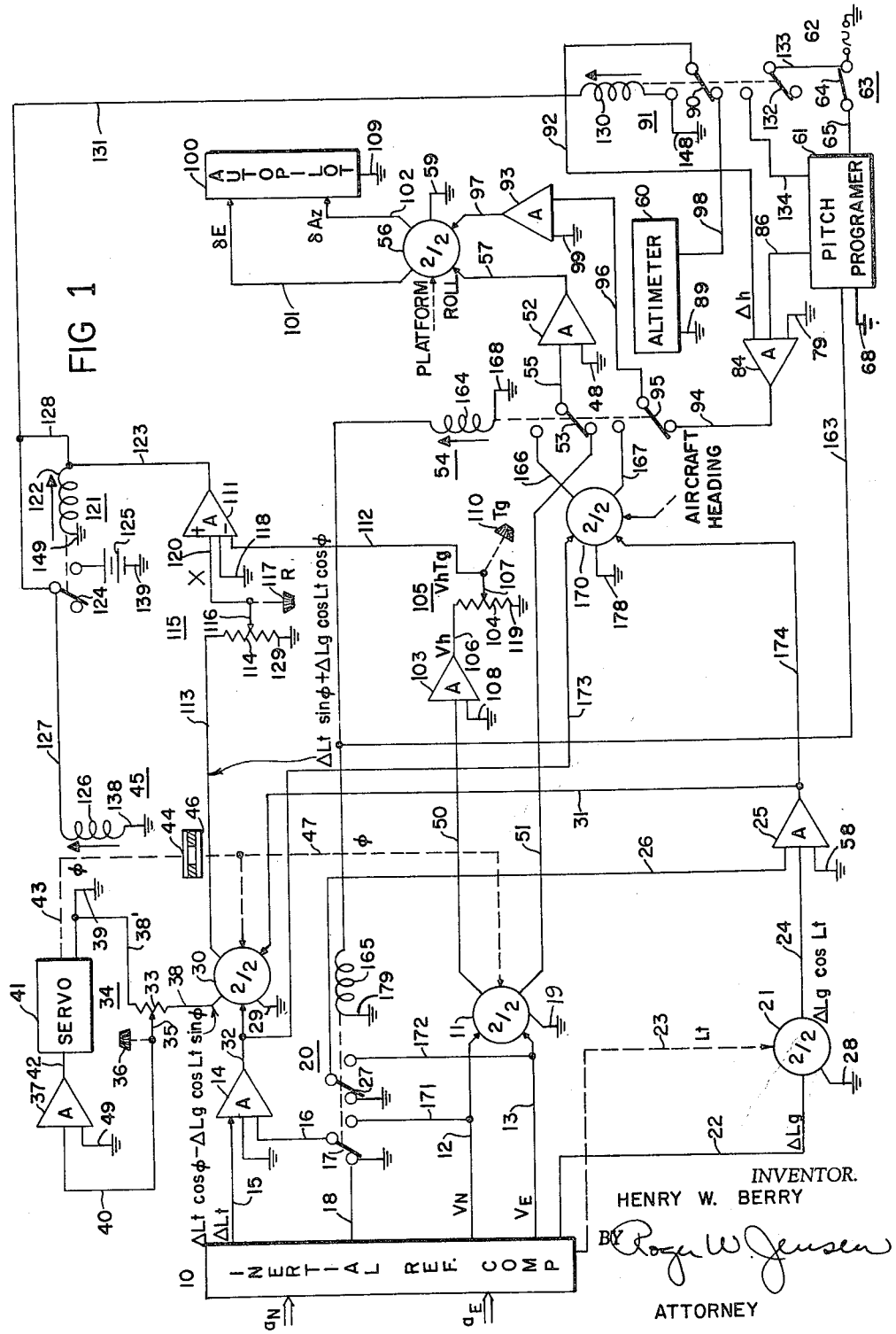
FIGURE 1 is a block diagram of the attitude controlling apparatus.

The present invention uses an inertial reference computer which provides signals representative of the differences between the latitude and longitude of a given reference and those of the present position of the craft, along with a signal representative of the present latitude of the craft, and signals representative of the ground velocity of the craft in north and east components. This type of device generally has inputs of north and east acceleration from which the output signals are derived.

In FIGURE 1 the inertial reference computer is shown as supplying to a first resolver synchro 11 signals representative of craft velocity in the north direction and in the east direction, the signals being represented by the symbols $V_N$ and $V_E$ and appearing as alternating voltages between conductors 12 and 13 respectively, and grounded conductor 18. Synchro 11 is provided with a ground return connection 19. Computer 10 also supplies to an amplifier 14 a signal representative of the latitude difference $\Delta L_t$ and supplies to a second resolver synchro 21 a signal representative of the longitude difference $\Delta L_g$, the signals appearing as alternating voltages between conductors 15 and 22 respectively and ground connection 18. Synchro 21 is provided with a ground return connection 28. Computer 10 is also shown as supplying to synchro 21 a mechanical signal 23 representative of the local latitude $L_t$ of the aircraft.

Computer 10 forms no part of the invention, and any conventional apparatus may be used for supplying these five signals. Patent 2,266,449 to Ullrich et al. shows means deriving from acceleration devices 11 and 15 mechanical velocity signals, on shafts 44 and 45, which are the same as my electrical signals on conductors 12 and 13, and mechanical displacement signals, on shafts 52 and 53, which are the same as my electrical latitude and longitude difference signals on conductors 15 and 22. Similarly, Patent 2,835,131 to Vacquier et al. teaches in connection with FIGURE 5 that his shaft driving indicator 40 is rotated in accordance with latitude. These mechanical signals can easily be converted to electrical signals by conventional means.

The geometry of the azimuth control portion of my invention is shown in FIGURE 4. The craft is located at point O and the target at point T. The distance $\Delta L_t$ is the latitude difference between the craft and the target, and is laid out in a north and south direction. The quantity $\Delta L_g \cos L_t$ is the longitude difference between the craft and the target, corrected for convergence of the meridians to give the same scale of distance as that for $\Delta L_t$, and is laid out in an east and west direction at right angles to $\Delta L_t$. The length X of the line OT and its azimuth angle $\phi$ are readily determined geographically. For the distances involved, Cartesian coordinates may be used instead of spherical coordinates, without appreciable error.

Consider any right triangle erected with vector X as a hypotenuse and one side defined by an angle $\phi_1$ measured at point 0. This triangle defines the track distance $X_1$ and the cross-track distance Y. It can be shown that $$Y = \Delta L_t \cos \phi_1 - \Delta L_g \cos L_t \sin \phi_1 \qquad (4)$$

Now if $\phi_1$ is varied until Y becomes equal to zero, $\phi_1$ becomes equal to $\phi$ and the vector $X_1$ becomes identical with vector X, the horizontal distance from the craft to the target.

For a further treatment and discussion of this derivation refer to "Electronic Instruments," volume 21 of the M.I.T. Radiation Laboratory Series, pages 158–162: chapter 10 of the same reference affords a full discussion of the resolver synchro about to be described, which performs the derivation electrically.

Returning to FIGURE 1 of the present application, resolver synchro 21 supplies a signal representative of $\Delta L_g \cos L_t$ on a connecting lead 24 which is connected to an amplifier 25 and the circuit is completed to ground connection 58. The $\Delta L_g \cos L_t$ signal is amplified in amplifier 25 and sent to a third resolver synchro 30 through a connecting lead 31, and an amplified signal representative of $\Delta L_t$ is sent to resolver synchro 30 through a connecting lead 32. The circuits are completed by connecting resolver synchro 30 to ground connection 29.

Synchro 30 is rotated, through a mechanical connection including a shaft 43, the plates 44 and 46 of a clutch having an actuating solenoid 126 and a shaft 47, by a servo 41 which contains a motor and a balancing network. The synchro gives a pair of output signals determined by the electrical and mechanical inputs thereto. A first of these signals appears between conducting lead 38 and ground connection 29, and is impressed across the wiring 33 of a potentiometer 34 having a wiper 35 adjustable by a control knob 36, the circuit being completed by conductor 38' and ground connection 39. Wiper 35 is connected to an amplifier 37 having a ground connection 49, and the amplifier energizes servo 41 to operate shaft 47 in such a sense as to reduce the magnitude of the signal on conductor 38.

The servo system just described is an electrical analog of the geometric configuration of FIGURE 4. The rotated position of shaft 47, at any time, from a standard or zero position is $\phi_1$, and the voltage on conductor 38 has the value $$\Delta L_t \cos \phi_1 - \Delta L_g \cos L_t \sin \phi_1$$

with Equation (4) defines as Y. Operation of servo 41 to reduce the input to amplifier 37—that is, the value of Y—to zero causes shaft 47 to take a position representative of the true azimuth angle $\phi$.

The angle $\phi$ is the bearing of the target from the aircraft. Shaft 47 is also connected to the rotor of resolver synchro 11. Since the rotor of resolver 11 is rotated through the angle $\phi$, resolver 11 supplies a track velocity signal which appears on a connecting lead 50, and a cross-track velocity signal which appears on a connecting lead 51. Connecting lead 51 supplies the cross-track velocity signal to an amplifier 52 through the switch arm 53 of a relay 54, a connecting lead 55, and ground connections 48 and 19. The cross track velocity signal is the normal lateral steering error signal for the craft: it is amplified by amplifier 52 and sent to a fourth resolver synchro 56 through a connecting lead 57. Resolver synchro 56 is provided with a ground connection 59, and has its rotor connected to the stable platform of inertial reference computer 10: when the aircraft rolls, a roll angle is imparted to the rotor of resolver synchro 56.

FIGURE 3 diagrammatically shows the final portion of the path in elevation of an aircraft using the invention. The target is located at point T, and the pitch attitude of the aircraft is initially controlled so as to maintain flight at a predetermined altitude $h$, as from Q to R. The horizontal distance X from the aircraft to the target decreases as the flight continues, and when, at point R, it becomes equal to $D_p$, defined in Equation 3 as equal to $V_h T_g$, a programmed change in pitch attitude of 90 degrees takes place, so that the aircraft follows some curved path from R to S. A preferred program for this curved portion of the path is given in Equation 1. At the point S the aircraft is ideally moving straight down and is directly over the target so that the quantities $\Delta L_t$, $\Delta L_g$, $V_N$, and $V_E$ all are zero. Minor errors may be corrected in the brief interval remaining before impact, cross-track errors being corrected as before, and along-track errors being corrected by change in pitch attitude, as will be explained.

The initial elevation steering error signal for the craft is made up of two parts, one of which is obtained from an altimeter 60 and the other of which is obtained from a pitch programmer 61 shown in FIGURE 2. A voltage source 62 has one terminal connected to ground; the other terminal is connected to a switch 63 which is actuated to its closed position at the time the craft is launched. Switch 63 has a contact arm 64 which is connected to pitch programmer 61 through a connecting lead 65 to drive a motor 66. Motor 66 is connected to a gear train 67 through a connecting shaft 70. Gear train 67 drives a pair of shafts 71 and 72. Shaft 72 is connected to a cam 73 which has a pitch attitude function machined into its surface and this function is detected by a cam follower 74, which in turn drives the rotor of a transmitting synchro 75 through a connecting shaft 76. Cam 73 is machined so that the signal produced by the rotor of transmitting synchro 75 is representative of the change in attitude desired to bring the craft to a new predetermined altitude. Transmitting synchro 75 is excited by an alternating voltage source through a pair of connecting leads 77 and 78. A voltage representative of the function of pitch attitude then appears on three leads 80, 81, and 82 which are connected to a receiver synchro 83 to receive the pitch attitude voltage. Receiver synchro 83 has a ground return 69 and a rotor which is connected to the stable platform of inertial reference computer 10 so that when the aircraft has a pitch attitude other than that programmed into transmitting synchro 75 a signal is received on the rotor winding of receiver synchro 83 and this is supplied, through a pair of connecting leads 85 and 86 which are interconnected by a switch arm 87 of a relay 88, to an amplifier 84 (FIGURE 1). The circuit is completed through ground returns 79 and 69.

A signal representative of altitude deviation is obtained from altimeter 60 and sent to amplifier 84 through a connecting lead 98, switch arm 90 of a relay 91 and a second connecting lead 92, the circuit being completed through ground connections 79 and 89. For applications where is is desired to control the craft to a particular altitude, the altimeter maintains the craft at a desired altitude. Altimeter 60 may be of any type which is capable of supplying signals representative of an altitude deviation from a given altitude. The signal which is supplied by amplifier 84 is sent to an amplifier 93 through a connecting lead 94, switch arm 95 of relay 54 and a connecting lead 96, the circuit being completed through a ground connection 99. After the normal elevation steering error signal is amplified by amplifier 93 it is sent to resolver synchro 56 through a connecting lead 97. After the two signals are resolved about the aircraft roll angle they are sent to an automatic pilot 100 through a pair of connecting leads 101 and 102, the circuit being completed through ground connections 109 and 59. Automatic pilot 100 controls the craft to fly a given course at a particular altitude and the course is generally that shown in FIGURE 4, where the signal representative of the cross-track velocity is used to keep the aircraft oriented towards the horizontal component of the craft-to-target vector.

The foregoing paragraphs describe the means by which I control the craft horizontally, and maintain it at a predetermined altitude. The next problem is to change the direction of movement of the craft in elevation so that it is descending vertically along a path which ends on the target. I have found that the safest and most precise craft operation during this transition takes place when the pitch attitude of the craft is programmed according to Equation 1.

As the craft approaches the target its distance X is continuously decreasing: when it becomes equal to $D_p$ the programmed pitch attitude change must be initiated, as follows.

The time $T_g$ required for the craft to execute the pitch-over maneuver, referred to as the time-to-go, may be determined, for any selected initial air speed $V_h$ of the craft, from the knowledge of its aerodynamic characteristics, and the product of this term multiplied by the air speed of the craft has the dimension of length and is equal to the distance $D_p$ from the target at which time programmed pitch attitude should be initiated. As the craft approaches the target from a distance its distance X is continuously decreasing: when it becomes equal to $D_p$ from Equation 3 the programmed pitch attitude change is then initiated as will now be described. A signal substantially representative of the craft velocity $V_h$ is obtained on a connecting lead 50 from resolver 11 and is sent to an amplifier 103 which is also connected to ground at 108. Amplifier 103 amplifies the velocity signal and this signal is sent to the resistive element 104 of a potentiometer 105 through a connecting lead 106: the other end of resistive element 104 is connected to ground at 119. Potentiometer 105 also has a wiper arm 107 which is adjusted by a control knob 110 in accordance with the time-to-go $T_g$ required to change attitude of the craft, and a signal representative of $V_h$, $T_g$, or $D_p$, is sent to an amplifier 111 through a connecting lead 112 which is connected to wiper arm 107, the circuit being completed through ground connection 118.

Resolver synchro 30 supplies on lead 113 a second output signal of magnitude $\Delta L_t \sin \phi \Delta + L_g \cos L_t \cos \phi$ which is representative of the angle subtended at the earth's center by the track velocity vector: to convert this to units of length it is necessary to multiply by the radius R of the earth. The resulting quantity is X of Equation 1. The angle signal appears on a connecting lead 113 which is connected to one end of the resistive element 114 of a potentiometer 115, the other end of resistive element 114 being connected to ground at 129. The wiper arm 116 associated with potentiometer 115 is adjusted by a control knob 117, to a value representative of the radius of the earth R so that the signal which appears on wiper arm 116 is representative of the quantity constituting the angle, multiplied by the radius of the earth and is the distance to the target X which appears on FIGURE 4 as the vector between the position of the craft and the target T. This signal is also sent to amplifier 111 through a connecting lead 120 and the circuit is completed by having amplifier 111 connected to ground connection 118. Thus the quantity $D_p$ is supplied to amplifier 111 on conductor 112, and the quantity X is supplied to the amplifier on conductor 120. The two signals are compared and the difference becomes zero when the craft is at the point where the pitch attitude is to be changed. When the two signals are equal the input to amplifier 111 becomes zero, and the amplifier operates a relay 121 which has a coil 122 connected to amplifier 111 by a connecting lead 123 and ground connection 128. The other end of coil 122 is connected to ground. When coil 122 of relay 121 is energized, a switch arm 124 is moved to make contact with a voltage source 125 which has its other terminal connected to ground at 139. This applies a voltage to a coil 126 of clutch 45 through a connecting lead 127, the circuit being completed to ground connection 138.

Amplifier 111 may be of any suitable structure: one such arrangement is shown in FIGURE 29 of my copending joint application with John H. Baldwin, Serial No. 751,594, filed July 23, 1958, now U.S. Patent No. 3,053,-487, and assigned to the assignee of the present application.

Coil 122 is kept energized by a holding circuit completed by a connecting lead 128. Another coil 130, of relay 91 is also energized by switch arm 124 through a connecting lead 131 and ground connection 148. As coil 126 is energized, clutch plates 44 and 46 are separated and shaft 47 remains stationary so that the angle $\phi$ is fixed in the rotors of resolver synchros 30 and 11. As coil 130 is energized on relay 91, switch arm 90 is connected to ground thereby placing the differential altitude signal $\Delta_h$ out of the circuit and connecting amplifier lead 92 to ground. A second switch arm 132, of relay 91, is also moved from its normally open position to a closed position and the voltage from voltage source 62 is supplied to pitch programmer 61 through a connecting lead 133, switch arm 132, and a second lead 134. Lead 134 supplies a voltage to a coil 135 of relay 88 (FIGURE 2) and the circuit is completed by having coil 135 grounded at 159. As coil 135 is energized, switch arm 87 is moved to connect a lead 136 to lead 86 and a second switch arm 137 is also moved from a normally open position to a closed position. A voltage source 140 which has one terminal connected to ground at 158 supplies a voltage to a coil 141 of a clutch 142 through a connecting lead 143, switch arm 137, and a connecting lead 144. The circuit is completed by having the other end of coil 141 connected to ground. As coil 141 is energized, a clutch plate 145 which is connected to shaft 71 is engaged with a second clutch plate 146 which is attached to a common shaft 147 causing shaft 147 to rotate. A potentiometer 150 comprises a resistive element 151 which is center tapped to ground at 169 and a wiper arm 152 which is connected to lead 136 and a cam follower 153. Resistive element 151 is energized by an alternating voltage source 154 through a pair of connecting leads 155 and 156. A cam 157 is connected to shaft 147 and has its surface cut as a function of the pitch attitude to be programmed, to change the craft from a horizontal attitude to a vertical attitude, and a voltage representative of this function is obtained from wiper arm 152. Therefore, a signal is provided to amplifier 84 which is representative of the pitch attitude which is programmed, to change the craft from a horizontal to a vertical dive attitude and this signal is sent to autopilot 100 as the elevation error signal. As motor 66 continues to drive shaft 147 through gear train 67 and clutch 142, a second cam 160 is also rotated through an angle representative of the time-to-go, $T_g$, and when the $T_g$ value is driven to zero, a lug portion 161 located on cam 160 actuates a switch arm 162 to provide an energizing voltage to a connecting lead 163 by contacting one end of voltage source 140. Connecting lead 163 (FIGURE 1) is connected to a coil 164 of relay 54 and to a coil 165 of relay 20 and the circuits are completed through ground at 168 and 179. As coil 164 is energized, switch arms 53 and 95 are moved to a second position to make contact with the output leads 166 and 167 of a fifth resolver synchro 170. Simultaneously, a pair of switch arms 17 and 27, of relay 20 are switched to a second position so that amplifier 14 is additionally energized with the $V_N$ signal through connecting lead 16, switch arm 17, and a connecting lead 171. In like manner, amplifier 25 is additionally excited by the $V_E$ signal through connecting lead 26, switch arm 27, and a connecting lead 172. Thus the signal amplified in each of amplifiers 14 and 25 is the sum of a displacement signal second and a rate signal; the output of amplifier 14 is sent to resolver 170 through a connecting lead 173 and the output of amplifier 25 is sent to resolver 170 through a connecting lead 174. The circuits are completed in resolver 170 through ground connection 178. Resolver 170 has its rotor positioned by the stable platform of inertial reference computer 10 in accordance with an angle representative of the deviation of the craft from a given reference, and thus varies with the heading of the aircraft. Thus the craft is steered to the target or predetermined destination, which is determined in coordinates of latitude and longitude, and this is accomplished by steering the craft through the autopilot with an elevation and azimuth error signal.

The embodiment shown for the pitch programmer 61 may be of any suitable type of programming device which will supply the necessary outputs and should not be limited to the embodiment shown in FIGURE 2.

*Operation*

The operation of the craft during typical conditions will now be described. The vehicle carrying the attitude control may be launched from another vehicle or may take off from any given location and through the use of pitch programmer 61 utilizing cam 73, the craft will attain an attitude which will place it at a predetermined altitude. The altitude will be maintained by the $\Delta_h$ signal from altimeter 60. As the craft is approaching the point of destination or target, the angle $\phi$ is generated to resolve the $\Delta L_t$ and $\Delta L_g \cos L_t$ signals into appropriate signals representative of track and cross-track vectors. The velocities are likewise resolved into components of track and cross track velocities where the cross-track velocity signal is used to steer the aircraft in azimuth and the component aligned with the distance vector or the in-track velocity component, when multiplied by the time to go, provides a signal to amplifier 111 so that relay 121 is actuated when the quantity $V_h T_g$ equals X. At this point, clutch 142 is actuated due to the energization of relay 91 and the pitch attitude of the craft is programmed through an angle of 90° to change the attitude to one of a vertical dive at which point the quantity $T_g$ is equal to zero. With $T_g$ equal to zero, the craft is directly over the target area or very close thereto, and cam 160 actuates relays 20 and 54 to once again steer the craft with the signals of latitude, longitude, and the velocities in north and east components, such that altitude is eliminated from any control of the craft. In other words, if the craft is directly over the target the latter mentioned quantities will all be equal to zero and the craft would intercept the target at the points which were predetermined at the commencemnet of the flight of the craft. During the treminal dive the craft is provided with a form of rate damping due to the velocity signals being combined with the displacement signals.

While I have shown and described a specific embodiment of this invention, the invention should not be limited to the particular form shown, and I intend in the appended claims to cover all modifications which do not depart from the spirit and scope of the invention.

What I claim is:

1. Control apparatus for controlling the attitude of a dirigible craft comprising: first measuring means for measuring the velocity of said craft in north and east components and the position of said craft in terms of latitude and longitude with respect to a predetermined reference and providing signals representative thereof; second measuring means for measuring the altitude of said craft and providing a signal representative thereof; computing means energized by said signals from said first measuring means for computing signals representative of the horizontal track and cross-track velocities of said craft; control means for controlling said craft to a first attitude in response to said signals representative of altitude and cross-track velocity; comparing means for comparing said signals representative of the latitude and longitudinal to said signal representative of the horizontal track velocity, each of which is multiplied by a constant so that an output is provided when said signals are equal so; first switching means responsive to said output from said comparing means to remove said signal representative of altitude from said control means; attitude changing means actuated by said output from said comparing means to provide a signal to said control means so that said craft is placed in a vertical dive; and second switching means actuated by said attitude changing means to switch the signal input to said control means from said attitude changing means to said velocity signals from said first measuring means so that said craft is controlled to intercept said predetermined reference.

2. Control apparatus for controlling the attitude of a dirigible craft comprising: inertial reference computing means for computing the velocity of said craft in north and east components and the position of said craft in terms of latitude and longitude with respect to a predetermined reference and providing signals representative thereof; measuring means for measuring the altitude of said craft and providing a signal representative thereof; resolving means energized by said signals from said inertial reference computing means for developing signals representative of the horizontal track and cross-track velocities of said craft; auto-pilot means for controlling said craft to a first attitude in response to said signals representative of altitude and cross-track velocity; comparing means for comparing said signals representative of the latitude and longitude to said signal representative of the horizontal track velocity, each of which is multiplied by a constant so that an output is provided when said signals are equal; first relay means responsive to said output from said comparing means to remove said signal representative of altitude from said auto-pilot means; attitude changing means actuated by said output from said comparing means to provide a signal to said auto-pilot means so that said craft is placed in a vertical dive; and second relay means actuated by said attitude changing means to change the signal input to said auto-pilot means from said attitude changing means to said signals from said inertial reference computing means so that said craft is controlled to intercept said predetermined reference.

3. Control apparatus for controlling the attitude of a dirigible craft comprising: inertial reference computing means for computing the velocity of said craft in north and east components and the position of said craft in terms of latitude and longitude with respect to a predetermined reference and providing signals representative thereof; measuring means for measuring the altitude of said craft and providing a signal representative thereof; first resolving means energized by said signals from said first measuring means for computing signals representative of the horizontal track and cross-track velocities of said craft; second resolving means energized by said signals representative of altitude and cross-track velocity for rotating said signals through an angle representative of the roll of said craft and providing signals representative thereof; control means for controlling said craft to a first attitude in response to said signals from said second resolving means; comparing means for comparing said signals representative of the latitude and longitude to said signal representative of the horizontal track velocity, each of which is multiplied by a constant so that an output is provided when said signals are equal; first switching means responsive to said output from said comparing means to remove said signal representative of altitude from said control means; attitude changing means actuated by said output from said comparing means to provide a signal to said control means so that said craft is placed in a vertical dive; third resolving means energized by said signals from said inertial reference computing means for rotating said signals through an angle representative of the heading of said craft and providing signals representative thereof; and second switching means actuated by said attitude changing means to switch the signal input to said second resolving means from said attitude changing means to said signals from said third resolving means so that said craft is controlled horizontally to intercept said predetermined reference.

4. The method of controlling the movement of a dirigible craft to cause it to pass through a point defined by its latitude, longitude, and elevation, when the differences between the latitudes and longitudes of the craft and the point, the northerly and easterly velocities of the craft, and its heading are known, which comprises the steps of computing from said differences the bearing of the point from the craft, resolving said velocities into components perpendicular to said bearing, resolving said differences into components perpendicular to said heading, initially controlling the craft in azimuth in accordance with the first named components, and ultimately controlling the craft in azimuth in accordance with the last named components.

5. The method of controlling the movement of a dirigible craft to cause it to pass through a point defined by its latitude, longitude, and elevation, when the differences between the latitudes and longitudes of the craft at the point, and its heading are known, which comprises the steps of resolving said differences into parallel and perpendicular components relative to said heading, controlling the craft in azimuth in accordance with the perpendicular components, and controlling the craft about the pitch axis thereof in accordance with the parallel components.

References Cited in the file of this patent

UNITED STATES PATENTS

| | | |
|---|---|---|
| 2,470,120 | Walker | May 17, 1949 |
| 2,821,349 | Sohn | Jan. 28, 1958 |
| 2,984,435 | Faith et al. | May 16, 1961 |

FOREIGN PATENTS

| | | |
|---|---|---|
| 1,005,077 | France | Dec. 12, 1951 |